Figure 1:
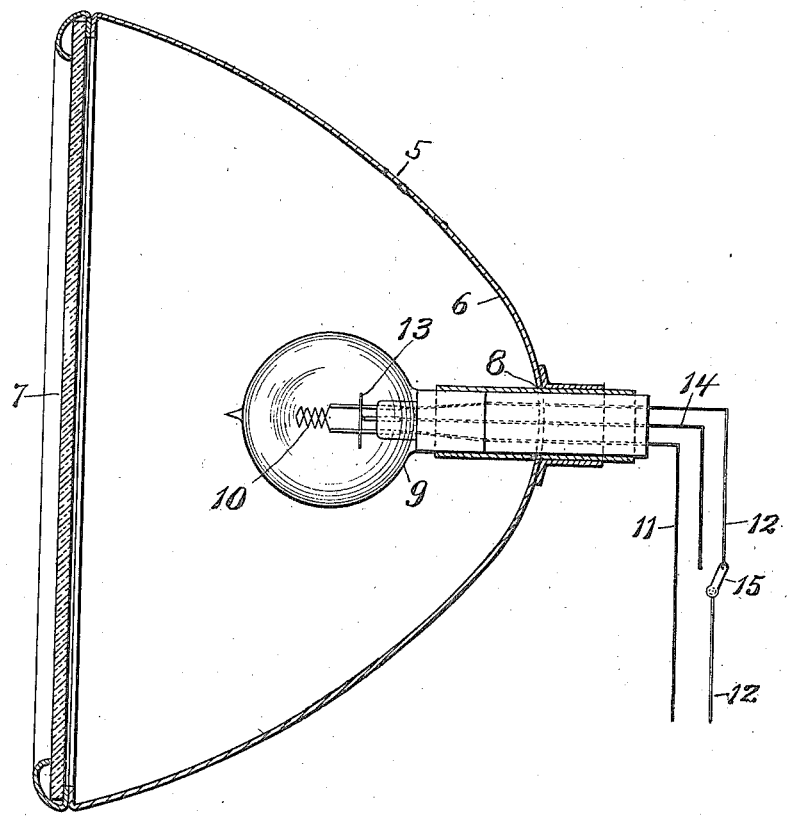

H. H. SLATER.
AUTOMOBILE LAMP.
APPLICATION FILED APR. 17, 1913.

1,229,538.

Patented June 12, 1917.

WITNESSES.
C. F. Miller.
Clara E. Muhlbach

INVENTOR.
Harvey H. Slater
By Morsell & Caldwell
ATTORNEYS.

UNITED STATES PATENT OFFICE.

HARVEY H. SLATER, OF KENOSHA, WISCONSIN, ASSIGNOR TO JAMES M. RICHARDSON, OF DETROIT, MICHIGAN.

AUTOMOBILE-LAMP.

1,229,538.  Specification of Letters Patent.  Patented June 12, 1917.

Application filed April 17, 1913. Serial No. 761,681.

*To all whom it may concern:*

Be it known that I, HARVEY H. SLATER, a citizen of the United States, and resident of Kenosha, in the county of Kenosha and State of Wisconsin, have invented new and useful Improvements in Automobile-Lamps, of which the following is a description, reference being had to the accompanying drawings, which are a part of this specification.

This invention relates to improvements in automobile lamps particularly although not solely adapted for automobile use.

The electric headlights now in use on automobiles are very bright in order to throw the rays of light a considerable distance ahead of the car and are very desirable and necessary in traveling on the country roads at night. In the cities, however, which are usually lighted at night, the headlights are unnecessarily powerful and have a tendency to momentarily blind and daze persons coming in the opposite direction with the result that accidents are often caused thereby.

In order to get the highest efficiency from the lamps the reflectors are made optically correct in shape and the electric lamp is so positioned within the reflector with relation to the walls thereof as to properly and efficiently focus and concentrate the reflected rays of light along the road ahead of the car.

It is one of the objects of the present invention to overcome the before mentioned objectionable features and to provide an automobile lamp which may be controlled in a very simple manner to give a powerful or a weak light when desired.

A further object of the invention is to provide an automobile lamp in which one of the filaments of the lamp is of less candle power than the other and is also out of focus with the reflector in order to provide a less powerful light when desired.

A further object of the invention is to provide an automobile lamp constructed to be controlled from the dash board of the automobile upon which the lamp is mounted.

A further object of the invention is to provide an automobile lamp which is of simple construction and is well adapted for the purpose desired.

With the above and other objects in view, the invention consists of the improved automobile lamp and its parts and combinations as set forth in the claims, and all equivalents thereof.

Figure 2:
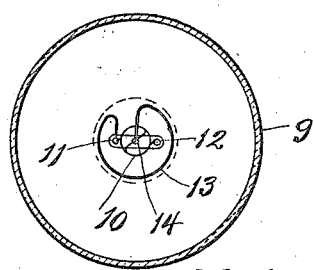

In the accompanying drawing in which the same reference characters indicate the same parts in all of the views:

Figure 1 is a central vertical sectional view of the improved lamp, the view also showing in diagrammatic form the wires connected to the lamp and the switch controlling the current thereto; and Fig. 2 is a transverse sectional view thereof.

Referring to the drawing the numeral 5 indicates a lamp casing, 6 the reflector portion thereof, 7 the glass front and 8 the lamp socket which is adapted to receive an incandescent lamp 9. The incandescent lamp projects inwardly into the lamp casing a sufficient distance to have the main or high candle power filament 10 in proper focus with relation to the reflector portion of the casing to reflect the light in the most efficient manner. The filament 10 while shown as of the usual spiral formation may be of any shape desired. The circuit wires 11 and 12 are connected to the opposite ends of this filament in the usual manner and extend to a source of current supply. A filament 13 of less candle power than the filament 10 is of circular form and one of its ends is connected to the circuit wire 11 and the other end is connected to a shunt wire 14 which is insulated from the other two wires.

The circuit wire 12 is interrupted by hand switch 15 which may be swung to break the circuit through the main wire 12 and complete the circuit through the shunt wire 14 and the low candle power filament.

The low candle power filament is so positioned with relation to the reflector as to be out of focus with said reflector and consequently will give a less brilliant light than the high candle power filament which is in focus with the reflector.

The switch 15 is adapted to be located on the dash board of the automobile for convenience of the operator.

From the foregoing description it will be seen that the automobile lamp is of very simple construction and is well adapted for the purpose described.

What I claim as my invention is:

1. In a headlight, the combination of a reflector having a focal center, an incandescent electric lamp bulb in the reflector, means located wholly at the rear of the focal center for supporting the bulb, said bulb being provided with a pair of filaments, one of which is positioned with its heated portion at the focal center of the reflector so that the rays therefrom are projected in substantially parallel beams, and the other filament positioned with its heated portion adjacent to but spaced apart from the focal center, so that the rays are projected in diverging beams, and electric circuits whereby one of the filaments may be heated independently of the other.

2. In a headlight, the combination of a reflector having a focal center and an optical axis, an incandescent electric lamp bulb in the reflector, means located wholly at the rear of the focal center for supporting the bulb, said bulb being provided with a pair of filaments, one of the filaments being of relatively high candle power and being located substantially in the focal center of the reflector, the other filament being of lower candle power and being removed from the first mentioned filament along the optical axis of the reflector, and electric circuits for heating the filaments, said circuits being arranged to heat one of the filaments independently of the other filament at will.

3. In a headlight, the combination of a reflector having a focal center and an optical axis, an incandescent electric lamp bulb in the reflector, means located wholly at the rear of the focal center for supporting the bulb, said bulb being provided with a pair of filaments, one of the filaments being of relatively high candle power and being located substantially in the focal center of the reflector, the other filament being of lower candle power and being removed from the first mentioned filament rearwardly along the optical axis of the reflector, and electric circuits for heating the filaments, said circuits being arranged to heat one of the filaments independently of the other filament at will.

4. In a headlight, the combination of a reflector having a focal center and an optical axis, an incandescent electric lamp bulb in the reflector, means located wholly at the rear of the focal center for supporting the bulb, said bulb being provided with a pair of filaments, one of the filaments being of relatively high candle power and being located substantially in the focal center of the reflector, the other filament being of lower candle power and being removed from the first mentioned filament along the optical axis of the reflector, said last mentioned filament extending substantially around the axis in a curved line, and electric circuits for heating the filaments, said circuits being arranged to heat one of the filaments independently of the other filament at will.

In testimony whereof, I affix my signature, in presence of two witnesses.

HARVEY H. SLATER.

Witnesses:
C. H. KEENEY,
EMILY SCHOWALTER.